April 5, 1927.
J. D. DURANT
1,623,832
INDICATOR FOR FUEL SUPPLY TANKS AND THE LIKE
Filed Dec. 3, 1924  2 Sheets-Sheet 1
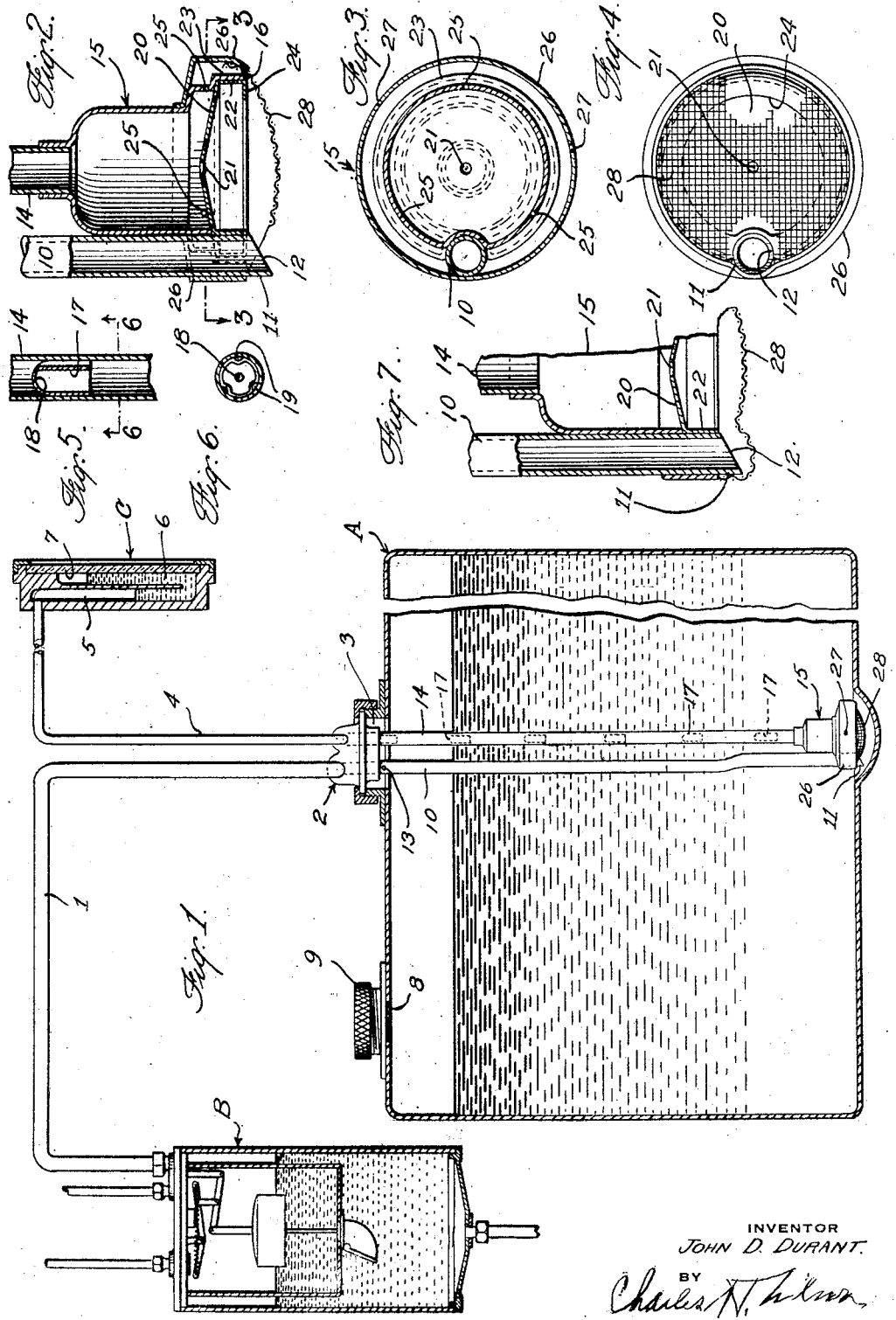
INVENTOR
JOHN D. DURANT.
BY
ATTORNEY April 5, 1927.
J. D. DURANT
1,623,832
INDICATOR FOR FUEL SUPPLY TANKS AND THE LIKE
Filed Dec. 3, 1924    2 Sheets-Sheet 2
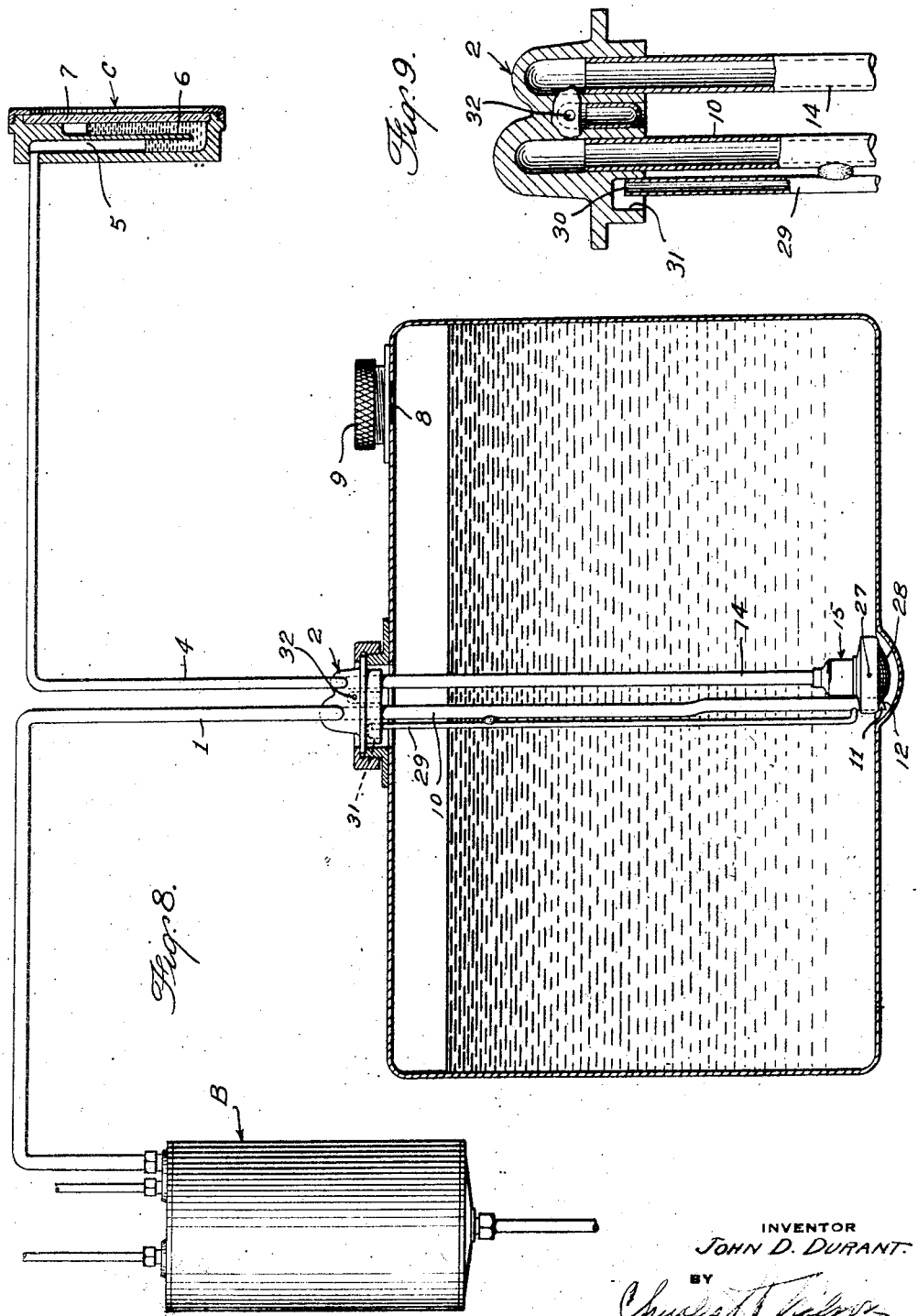
INVENTOR
JOHN D. DURANT
BY
ATTORNEY Patented Apr. 5, 1927.

1,623,832

UNITED STATES PATENT OFFICE.

JOHN D. DURANT, OF NEW YORK, N. Y., ASSIGNOR TO THE SCHAAP-DURANT CONTROL CORPORATION, OF NEW YORK, N. Y., A CORPORATION OF NEW YORK.

INDICATOR FOR FUEL SUPPLY TANKS AND THE LIKE.

Application filed December 3, 1924. Serial No. 753,663.

This invention relates to indicators, and more particularly to an indicating device operating upon the hydrostatic principle for indicating the liquid content of a tank or other receptacle. In the present instance the device is adapted to indicate the quantity of liquid fuel in the fuel supply tank of an automobile, where the vacuum feed principle is employed to withdraw the liquid fuel from the supply tank.

One of the objects of the invention is to provide in an indicator of the above character, new and improved means for rectifying and correcting the gauge.

Another object is to provide a device of the above character, wherein the liquid indicating medium in the gauge head will not surge or fluctuate under any condition of service, but will remain steady, and thereby at all time give an accurate indication.

Another object of the invention is to provide a device of the above character, wherein there is provided a supplementary air body in the lower end of the gauge conduit, which air body is designed to maintain the gauge in rectified condition under the influences of changes of temperature, or vibratory disturbances of the apparatus, such as would tend to dislodge a portion of the rectifying medium from the lower end of the gauge conduit.

Other objects and aims of this invention more or less specific than those referred to above, will be in part obvious and in part pointed out in the course of the following description of the elements, combinations, arrangements of parts and applications of principles constituting this invention; and the scope of the protection contemplated will be indicated in the appended claims.

In the accompanying drawings, wherein there is shown preferred forms of embodiments of the invention:

Figure 1 is a schematic view illustrating the invention, adapted for use in connection with the liquid fuel supply tank of an automobile.

Figure 2 is a vertical sectional view taken through the lower end of the rectifying device.

Figure 3 is a horizontal sectional view taken substantially on the line 3—3 of Figure 2, looking in the direction of the arrows.

Figure 4 is a bottom plan view of the rectifying means.

Figure 5 is a vertical sectional view taken through a portion of the gauge conduit, showing one of the baffles employed therein.

Figure 6 is a horizontal sectional view taken on the line 6—6 of Figure 5.

Figure 7 is a vertical sectional view taken through a portion of the rectifying means, showing a slightly modified form of construction.

Figure 8 is a schematic view of a modified form of the indicating device; and

Figure 9 is a vertical sectional view showing a detail of construction.

Referring now to the drawings, wherein similar reference characters refer to similar parts throughout the several views thereof, the reference character A denotes a liquid fuel supply tank, B the usual vacuum tank, and C the gauge. At this point it may be noted that while the improved indicating device is adapted for use where vacuum tanks are utilized to withdraw the liquid fuel from the supply tank, the device is operable in cases where a pump is employed to withdraw the liquid fuel from said supply tank.

In practice, in a liquid fuel supply system of the vacuum type, the liquid fuel supply tank A is usually located under the body of the car, adjacent the rear axle, the vacuum tank B at a point under the hood of the automobile above the carburetor, and the gauge C is preferably located on the dash or instrument board, in a position to be observed by the occupant of the driver's compartment.

The function of the vacuum tank B is to draw liquid fuel through the conduit 1 from the liquid fuel supply tank, mechanism being employed in the vacuum tank to trip or operate valve mechanism contained therein, when a sufficient quantity of liquid fuel has been drawn into the vacuum tank, such operation permitting the liquid fuel remaining in the conduit 1 to return by gravity to the liquid fuel supply tank.

In the present instance the conduit 1 leads through a fitting 2, suitably mounted in an aperture 3 formed in the upper wall of the liquid fuel supply tank. Similarly connected with the upper wall of the liquid fuel supply tank, is a conduit 4, which leads to the gauge C, which as above described, is preferably located on the dash or instrument panel of the automobile.

The gauge C is provided with a U-shaped tube 5, which contains a quantity of liquid 6, the latter constituting the indicating medium, which through co-operation with a suitable scale, not shown, provided in the front transparent wall 7 of the gauge, indicates the quantity of liquid in the tank.

The upper wall of the liquid fuel supply tank is provided with the usual aperture 8, through which the liquid fuel is introduced into the tank, and which is closed by a cap 9, which if desired, may be provided with the usual vent, through which the air is admitted to the supply tank as the liquid fuel is withdrawn therefrom through the conduit 1. If desired, the usual vent provided in the cap 9 may be employed in the fitting 2.

Extending downwardly into the tank from the fitting 2 is a conduit 10, the lower end 11 of which terminates in contiguous relation with the lower wall of the supply tank. The lower end 11 of this conduit is preferably beveled off, as at 12, for a purpose which will be apparent hereinafter.

Conduit 10, near its upper end, and within the supply tank, is provided with an aperture or port 13. Extending downwardly into the liquid fuel supply tank is a second conduit 14, which conduit in the present instance leads from a bell-shaped receptacle 15, the lower end 16 of this receptacle terminating adjacent the lower open end of the conduit 10, slightly above the same. The said receptacle 15 and the lower end of the conduit 10 are preferably located in contiguous lateral relation, the construction being such that air bubbles discharged through the lower open end of the conduit 10 into the supply tank will, by their buoyancy, rise and find their way into the receptacle 15.

At this point it will be noted that the beveled off portion 12 of the lower end of the conduit 10 faced toward the mouth of the bell, facilitates this operation, by giving direction to the said discharged air bubbles. Located in the conduit 14, at suitable spaced intervals are domed or conical baffles 17, which baffles are preferably held in position in the conduit by surface friction, the baffles being constructed with central ports 18 and side grooves 19, permitting air to pass through or around them, but providing resistance to the surging of a heavier medium, such for instance as the liquid fuel located in the tank A. These baffles also serve to restrain the liquid in the fuel supply tank from rushing up into the conduit 4, leading to the gauge C, in the event that the said conduit 4 should become disconnected at the gauge C, for instance, or in the fitting 2.

Extending transversely of the receptacle 15 a slight distance from the lower end 16 thereof, is a conically formed partition 20, having a centrally located aperture 21. This partition is carried by an annular ring 22, which fits nicely into the lower rim 23 of the receptacle 15. The ring 22 is provided with an inwardly extending annular shelf 24. Extending through the wall of the receptacle 15, at a position slightly below the aperture or port 21 of the partition 20, are a plurality of minute apertures 25 mounted upon the receptacle 15, and extending downwardly in spaced relation to the rim 23 thereof, is a ring 26. This ring is also provided at suitably spaced intervals with a plurality of minute apertures 27, which apertures are preferably located in staggered relation with the apertures 25 of the receptacle 15, but on the same plane.

The function of this ring 26 is to provide a trap for the air bubbles that might emerge through ports 25 as a result of vibration or excess liquid pressure, thus forming an air lock to prevent the further loss of air from the gauge system. Positioned below the receptacle 15 is preferably provided a meshed screen 28, the latter being preferably carried by the ring 26, which screen, as shown in Figures 1, 2 an 4, constitutes a restraining means to prevent the air from being dislodged from the bottom of the receptacle 15.

In the modification shown in Figure 7, this screen 28 is extended over the lower open end of the conduit 10, whereby the screen forms the additional function of removing foreign bodies from the liquid fuel being withdrawn from the liquid supply tank through the conduit 10.

In the embodiment of the invention shown in Figure 8, the construction of the apparatus is similar in all respects to the construction of the embodiment of the invention next above set forth, with the exception that the port or vent 13 in the conduit 10 has been omitted. In this embodiment of the invention a tube 29 is provided for introducing air into the conduit 10. This tube extends upwardly, preferably in parallel relation to the conduit 10, and supported thereby, having its upper open end 30 located in a small chamber 31 formed in the fitting 2, as clearly shown in Figure 9. In this embodiment of the invention a vent 32 is provided in the fitting, which communicates with the interior of the liquid fuel supply tank, the purpose of which is to insure an adequate supply of air within the fuel supply tank, for the proper operation of the gauge system, in the event that the aperture ordinarily provided in the filler cap is inadequate to supply the necessary volume of air, or should become clogged or stopped up.

Referring again to the embodiment shown in Figures 8 and 9 of the drawings, it will be observed that the tube 29 conducts air into the conduit 10, at a point adjacent its lower end. This structure is useful in connection with vacuum systems wherein a check valve might be employed to prevent the liquid fuel from running back into the liquid supply tank by gravity when the vacuum tank ceases to withdraw liquid fuel from said supply tank, or where a liquid fuel pump is employed for transporting the fuel from the liquid supply tank to the carburetor.

Having thus described the construction of these embodiments of the invention, the operation thereof may now be understood.

Referring to Figure 1 of the drawings, and assuming that a quantity of liquid fuel has been provided in the indicator gauge C, it will be observed that a hydrostatic balance is established between the body of the liquid fuel in the supply tank A and the column of liquid in the U-shaped tube of the gauge C, the pressure of the liquid fuel exerted upon the air imprisoned in the conduits 14 and 4 maintaining the said hydrostatic balance, whereby the level indicating medium in the gauge tube, in conjunction with the scale will indicate at all times the quantity of liquid fuel in the supply tank.

It will be understood, of course, that the relativities of the indicator medium, the scale calibration of the gauge, and the capacity of the liquid fuel supply tank have previously been determined, whereby the gauge will supply an accurate indication for a given sized supply tank.

In the embodiment of the invention shown in the first described embodiment, during the operation of the vacuum tank, liquid fuel will be drawn through the conduits 10 and 1 into the vacuum tank. During this suction flow of the liquid fuel from the supply tank to the vacuum tank air will be drawn into the conduits 10 and 1, through the aperture or port 13, the air being thus entrained in the liquid fuel passing upwardly into the vacuum tank. Some of this entrained air will, of course, be present in the conduits 10 and 1 when the vacuum tank ceases to withdraw the liquid fuel from the supply tank. The liquid fuel contained in said conduits will then flow back into the supply tank, and this recessional flow of the liquid fuel will discharge a quantity of said entrained air from the lower end 12 of the conduit 10. This air will thereupon rise and enter the lower end of the receptacle 15, passing upwardly therein through the port 21, whence it passes into the conduit 14.

The above operation occurs during the initial rectifying of the gauge. When the gauge has once been rectified, as above set forth, and the liquid has been excluded from conduit 14, thereafter during the continued operations of the vacuum tank, the gauge system will receive only such quantity of air as is necessary to maintain the gauge in a rectified condition.

Thus the indicating medium in the gauge moves relatively to the scale, so as accurately to indicate the varying level of the liquid fuel in the supply tank, the construction being such that more than a sufficient quantity of air to make the correction or rectification is discharged against the lower open end of the gauge system, excess of air discharged against said open end being naturally rejected.

Referring now to the supplementary body of air present in the receptacle 15, and below the partition 20, this air, contiguous with that imprisoned in the gauge conduits 14 and 4, and the upper part of receptacle 15 automatically compensates for any contraction of the air in conduits 14 and 4 and the upper part of receptacle 15 as a result of temperature changes, or loss of imprisoned air through the ports 25 and 27, due to vibrational disturbances.

The operation of the embodiment of the invention shown in Figures 8 and 9, in so far as the rectification of the gauge is concerned, is identical with that already described. In this embodiment of the invention, however, it will be noted that the rectifying air may be drawn through the tube 29 during the recessional flow of the liquid fuel through the suction conduit 10. In the event, however, that a check valve or similar device is employed to hold the liquid fuel in the suction line when the vacuum tank ceases to withdraw liquid fuel from the supply tank, the recoil of the suddenly arrested flow of the liquid fuel causes sufficient quantities of the entrained air to be discharged through the lower open end of the suction conduit 10, to maintain the necessary supply of air in the gauge system.

The function of the compartment formed by the annular ring 26 is to provide a collector for air discharged through the minute apertures 25, provided in the rim of the receptacle 15, and it thereby assists in maintaining the supplementary air body, because when this compartment becomes filled with air, it constitutes an air lock which restrains the escape of air through the ports 25.

It will accordingly be seen that the construction above set forth attains, among others, all the ends and objects above pointed out. It will be noted that the level at which the imprisoned air in the gauge system is sensitive to, or affected by, the pressure of the liquid fuel contained in the supply tank, is determined by the location of the ports or apertures 25, 27 provided in the rim of the bell and the air lock at the lower end of the gauge system. The supplementary air body held at the mouth of the bell therefore is below the level of effective pressure transmission, and is established and maintained for the purpose of supplying any deficiency that may result through the contraction of the air above it, due to temperature variations, or to replace vibrational or leakage losses of air. Thus, in case of shrinkage of the air in the pressure line, due, for instance, to the standing of a car over night in a cool garage, the loss is automatically compensated for, as the need arises, by the reservoir air filtering up into the bell. The gauge reading can thus be relied upon even after the system has been standing idle for some time. The centrally pierced upwardly contracted or conical baffles in the gauge line have the effect of squeezing the air bubbles into pointed shape so that they readily thread their way up through any liquid in this line without pushing the liquid before them and the down passages in the sides of these baffles permit liquid in the tube to run down the sides of the tube, out of the way of the rising air bubbles. The natural tendency of the liquid to adhere to the walls of the tube is thus taken advantage of in returning the liquid to the tank. Because of such conical form also these baffles effectively check any liquid rising in the conduit.

It will also be noted that no means is provided for discharging air into the gauge system. Entrained air from the suction system is discharged directly into the supply tank, thereafter by reason of its buoyancy finding its way into the gauge system in such quantities as are necessary to maintain the hydrostatic balance.

As many changes could be made in this construction without departing from the scope of the following claims, it is intended that all matter contained in the above description or shown in the accompanying drawings shall be regarded as illustrative only and not in a limiting sense.

Having thus described my invention what I claim as new and desire to secure by Letters Patent of the United States, is:

1. In apparatus of the character disclosed, a liquid containing tank, a pressure gauge, a conduit extending from said gauge into the liquid in the tank and in communication with the liquid at a pressure transmitting level in the tank and means within the tank for automatically maintaining a supply of pressure transmitting fluid in the tank below said pressure transmitting level and in communication with the conduit at a point above such level.

2. In apparatus of the character disclosed, a liquid containing tank, a pressure gauge, a conduit extending from said gauge into the tank and in communication with the liquid at a pressure transmitting level and means for automatically maintaining a supply of pressure transmitting fluid below said level and in communication with the conduit at a point approximately at such level, said means including in part a conical diaphragm entered in the lower end of the conduit rising as far as the pressure transmission level and having an opening therethrough approximately at the pressure transmission level.

3. In apparatus of the character disclosed, a liquid containing tank, a pressure gauge, a conduit extending from said gauge into the tank and in communication with the liquid at a pressure transmitting level, means for automatically maintaining a supply of pressure transmitting fluid below said level and in communication with the conduit at a point approximately at such level and means forming a fluid pressure lock surrounding said pressure maintaining means for restraining the pressure fluid.

4. In combination with a liquid containing tank, a pressure conduit entered in said tank having a bell open to the liquid for transmission of the liquid pressure to said conduit, a partition in the mouth of said bell below the pressure transmitting level and having a restricted passage open to the interior of the bell and means for furnishing a supply of pressure transmitting fluid beneath said partition, said partition being domed upwardly into the bell and having a passage therethrough located substantially at the highest point thereof and forming the restricted passage aforesaid.

5. In combination, a liquid containing tank, a pressure conduit entered in said tank and having a transversely extending partition in the lower end of the same, said partition having a restricted passage therethrough, an inwardly directed flange about the mouth of the conduit below the partition and said conduit having a restricted liquid pressure transmitting passage in the side of the same above the partition.

6. In combination, a liquid containing tank, a pressure conduit entered in said tank and having a transversely extending partition in the lower end of the same, said partition having a restricted passage therethrough, an inwardly directed flange about the mouth of the conduit below the partition, said conduit having a restricted liquid pressure transmitting passage in the side of the same above the partition and means forming a fluid pressure lock surrounding the lower end of the conduit and having a restricted liquid pressure transmitting opening at approximately the level of said pressure transmitting passage in the conduit.

7. In combination, a liquid containing tank, a pressure gauge, a pressure conduit extending from said gauge into the tank, an upwardly faced conical diaphragm in the lower end of said conduit having an opening through the top of the same, the conduit having a pressure transmitting passage open to the liquid in the tank at a level above the diaphragm but below the opening in the diaphragm and a pressure fluid conduit having a discharge mouth disposed below the conical diaphragm for delivering pressure transmitting fluid beneath the same.

8. In combination, a liquid containing tank, a pressure gauge, a pressure conduit extending from said gauge into the tank, an upwardly faced conical diaphragm in the lower end of said conduit having an opening through the top of the same, the conduit having a pressure transmitting passage open to the liquid in the tank at a level above the diaphragm but below the opening in the diaphragm, a pressure fluid conduit having a discharge mouth disposed below the conical diaphragm for delivering pressure transmitting fluid beneath the same and a ring surrounding the pressure conduit having a pressure transmitting opening therein substantially on a level with the pressure transmitting opening in said conduit.

9. In combination, a liquid containing tank, a pressure conduit entered in and submerged in the liquid therein, a series of conical baffles disposed in superposed relation in said conduit having central passages for ascending air bubbles and side passages for descending liquid and a pressure actuated device connected with the upper end of said conduit.

10. As a new article of manufacture, a depth gauge unit comprising a cap for application to a tank opening, suction and pressure tubes dependent from said cap, the suction tube having a restricted air intake open to take in air near the upper portion of said tube and having an unrestricted liquid inlet at its lower end, the pressure conduit being open at its lower end and having such open lower end disposed adjacent and above the lower end of the suction conduit to receive entrained air discharged from the same into the liquid in the tank, means for restraining a body of such released air in the mouth of the pressure conduit, including an upwardly faced conical diaphragm in the lower end of the pressure conduit having a restricted passage by which such restrained air is in communication with the interior of the conduit and the conduit having a restricted passage at approximately the level of the first passage for transmission of liquid pressure to the interior of the conduit.

11. As a new article of manufacture, a depth gauge unit comprising a cap for application to a tank opening, suction and pressure tubes dependent from said cap, the suction tube having a restricted air intake therein and an unrestricted liquid inlet at its lower end, the pressure conduit being open at its lower end and having such open lower end disposed adjacent and above the lower end of the suction conduit to receive entrained air discharged from the same into the liquid in the tank, means for restraining a body of such released air in the mouth of the pressure conduit, including an upwardly faced conical diaphragm in the lower end of the pressure conduit having a restricted passage by which such restrained air is in communication with the interior of the conduit and the conduit having a restricted passage at approximately the level of the first passage for transmission of liquid pressure to the interior of the conduit and an air lock ring surrounding the lower end of the pressure conduit in communication with the pressure conduit and having a restricted way therethrough at substantially the level of the pressure transmission passage in the pressure conduit for transmission of the liquid pressure.

12. In combination, a liquid containing tank, a liquid withdrawal pipe extending down through the liquid in said tank and in communication with such liquid near the bottom of the tank, a small air induction tube open at the top and extending from above the liquid level in the tank downwardly and into the liquid withdrawal pipe near the lower end of the same, a pressure transmission conduit extending down through the liquid in the tank to a position near the bottom of the tank and having its lower end open and positioned to receive entrained air discharged from the lower end of the liquid withdrawal pipe and a gage instrument connected with the upper end of said pressure transmission conduit.

In testimony whereof, I affix my signature.

JOHN D. DURANT.